United States Patent [19]

Owens et al.

[11] Patent Number: 4,673,518

[45] Date of Patent: Jun. 16, 1987

[54] SYNTHETIC POLYETHER THICKENERS AND THICKENED AQUEOUS SYSTEMS CONTAINING THEM

[75] Inventors: James P. Owens, Wyandotte; Charles F. Deck, Trenton, both of Mich.

[73] Assignee: BASF Corporation, Wyandotte, Mich.

[21] Appl. No.: 837,537

[22] Filed: Mar. 7, 1986

[51] Int. Cl.$^4$ ............... C10M 119/16; C10M 173/02
[52] U.S. Cl. ..................................... 252/75; 252/73; 252/77; 568/620; 568/624; 568/625
[58] Field of Search ...................... 252/73, 75, 77; 568/620, 624, 625

[56] References Cited

U.S. PATENT DOCUMENTS

| | | | |
|---|---|---|---|
| 4,257,902 | 3/1981 | Singer | 252/75 |
| 4,288,639 | 8/1981 | Camp | 568/625 |
| 4,368,133 | 1/1983 | Forsberg | 252/75 |
| 4,411,819 | 10/1983 | Panek et al. | 568/624 |
| 4,481,125 | 11/1984 | Holgado | 252/75 |
| 4,491,526 | 1/1985 | Deck | 252/78.5 |

*Primary Examiner*—Robert A. Wax
*Attorney, Agent, or Firm*—Bernhard R. Swick

[57] ABSTRACT

This invention relates to synthetic polyether thickeners and thickened aqueous systems containing them. The thickeners are unique because they can be used in aqueous systems at less than ten percent weight concentration which will flow in a Vickers 104(C) Vane pump at use temperatures. These properties make them particularly useful for thickening hydraulic fluids used in high pressure vane and gear pumps. The thickeners are prepared by reacting conventional polyether polyols with alpha-olefin epoxides having an average of 6 to 12 total carbon atoms to obtain products with specific epoxide-to-hydroxyl ratios.

25 Claims, No Drawings

SYNTHETIC POLYETHER THICKENERS AND THICKENED AQUEOUS SYSTEMS CONTAINING THEM

BACKGROUND OF THE INVENTION

1. Field of the Invention

This invention relates to synthetic polyether thickeners and thickened aqueous systems containing them, particularly hydraulic fluids. The thickeners are prepared by reacting conventional polyether polyols with alpha-olefin epoxides having an average of from 6 to 12 total carbon atoms at effective epoxide to hydroxyl ratios which will produce thickeners with the desired properties.

2. Description of the Prior Art

Thickeners are known which can operate under severe shear forces, such as vane and gear pumps operating at pressures of 2000 psig and above. Examples of such thickeners are conventional polyether polyols (polyoxyalkylene polymers) having a molecular weight of approximately 10,000 to 50,000. The problem with these thickeners is that it takes large concentrations (at least 15 percent and usually more than 20 and 30 percent) to produce sufficient thickening efficiency.

Higher molecular weight thickeners such as gums and cellulose derivatives have excellent thickening efficiency, but are not shear stable even at lower operating pressures.

In an effort to solve the problems with the prior art thickeners, associative polyether thickeners as described in U.S. Pat. No. 4,411,819 were created. Although these thickeners have excellent thickening efficiency and work well in piston pumps operating at pressures of 2000 psig, they are not effective for fluids which are subject to higher shear forces, for instance, shear forces found in vane pumps and gear pumps operating at 2000 psig and above.

Herein is described a thickener which will not only operate in a vane or gear pump at 2000 psig, but will do so at a concentration which is economical to use.

SUMMARY OF THE INVENTION

The subject invention relates to synthetic associative polyether thickeners prepared by reacting a conventional polyether polyol with an alpha-olefin epoxide having an average of from 6–12 total carbon atoms such that (a) the reaction is carried out in the presence of an oxyalkylation catalyst at a temperature of from about 50° C. to about 150° C.; and (b) an effective epoxide-to-hydroxyl ratio is used which will produce a thickener
  (i) which will have sufficient thickening efficiency to be used at less than ten percent weight concentration in an aqueous system; and
  (ii) which will produce thickened aqueous systems that will flow in a Vickers 104(C) vane pump at 2000 psig.

In addition to the advantages already disclosed, the thickeners also produce thickened aqueous systems and hydraulic fluids which show less sensitivity, with respect to viscosity, to oil contamination than aqueous systems and hydraulic fluids thickened with the thickeners disclosed in U.S. Pat. No. 4,411,819. These advantages are achieved because alpha-olefin epoxides are used which have shorter carbon chain lengths, and because the epoxide to hydroxyl ratio of the molecule is kept within limits effective for achieving the desired results.

The invention also relates to thickened aqueous systems, particularly hydraulic fluids, which contain sufficient thickener to achieve the thickening efficiency needed for the specific application.

DESCRIPTION OF THE PREFERRED EMBODIMENTS

The conventional polyethers polyols used to prepare the subject synthetic thickeners are well known in the art. Essentially they are prepared by reacting an initiator, having at least two active hydrogen atoms with one or more epoxides having from 2 to 4 carbon atoms, in the presence of an oxyalkylation catalyst at increased temperatures and pressures according to techniques well known in the art, such as those described in U.S. Pat. Nos. 4,411,819 and 4,288,639 which are hereby incorporated by reference into this specification. The particular conventional polyether polyol selected naturally will vary depending upon the use. It may be a homopolymer (preferably based upon ethylene oxide), a block copolymer (preferably with an internal ethylene oxide segment), or a heteric copolymer. These terms are familiar in the art and need no further explanation. The heteric copolymers are generally preferred because they are liquid at ambient temperatures. The significant aspect of the invention is that the thickening efficiency and shear stability of the conventional polyether polyol is changed, in a manner that could not have been predicted, by reacting the conventional polyether polyol with the alpha-olefin epoxide.

The alpha-olefin epoxides which are reacted with the conventional polyether polyols to prepare the subject synthetic polyether thickeners have an average of from 6 to 12 total carbon atoms. They are well known in the art and are commercially available under the trademark VIKOLOX.

The reaction between the conventional polyether polyol and the alpha-olefin epoxide can be carried out according to the methods described previously for the preparation of the conventional polyether polyol. Essentially the conventional polyether polyol and alpha-olefin epoxide are reacted in the presence of an oxyalkylation catalyst at a temperature from about 50° C. to 150° C., preferably under an inert gas blanket from about 30 psig to 90 psig. The procedure is described in U.S. Pat. Nos. 4,411,819 and 4,288,639 mentioned previously.

In addition to using alpha-olefin epoxides having an average of 6 to 12 total carbon atoms, it is important to use the reactants in effective amounts. In general, effective amounts of conventional polyether polyols and alpha-olefin epoxide are defined as follows:

(a) if a $C_{12}$ alpha-olefin epoxide is reacted with the conventional polyether polyol, then the epoxide-to-hydroxyl ratio is from about 0.50 to about 1.0;

(b) if a $C_{10}$ alpha-olefin epoxide is reacted with the conventional polyether polyol, then the epoxide-to-hydroxyl ratio is from about 0.75 to about 1.25;

(c) if a $C_8$ alpha-olefin epoxide is reacted with the conventional polyether polyol then the epoxide-to-hydroxyl ratio is from about 1.0 to about 2.0; and (d) if a $C_6$ alpha-olefin epoxide is reacted with the conventional polyether polyol, then the epoxide-to-hydroxyl ratio is from about 1.5 to about 3.0.

It should be noted that the effective epoxide-to-hydroxyl ratio for the $C_{11}$, $C_9$, and $C_7$ alpha-olefin epoxides is based upon extrapolation from data based upon the $C_8$, $C_{10}$, and $C_{12}$ alpha-olefin epoxides.

With this information, one skilled in the art can prepare thickeners, which have sufficient thickening efficiencies at a concentration of less than 10 percent by weight in an aqueous system, which will flow at operating pressures of 2000 psig in a Vickers 104(C) vane pump.

Thickeners prepared outside the specified epoxide-to-hydroxyl ratio will not have both adequate thickening efficiency and flowability at pressures of 2000 psig and greater.

Mixtures or cogeneric mixtures of the described thickeners can also be used. It is also contemplated that mixtures or cogeneric mixtures of the subject thickeners and other synthetic thickeners, such as those described in U.S. Pat. No. 4,411,819, may be used for specific applications.

The molecular weight of the synthetic polyether thickener will vary over wide ranges and will depend upon the specific application. However, for most applications it will generally range from 1,000 to 100,000, and for most uses will vary from 5,000 to 50,000, generally from 10,000 to 40,000.

The basic utility of the thickeners is to thicken aqueous systems, particularly hydraulic and other functional fluids. The thickeners will have sufficient thickening efficiency to be used at less than ten percent concentration in an aqueous system, preferably less than seven percent by weight, based upon the total weight of the aqueous system to be thickened. Generally, the thickening efficiency needed for most applications is expressed as a kinematic viscosity at 38° C. of from 10 centistokes to 100 centistokes, usually from 25 centistokes to 75 centistokes, and in most cases from 40 centistokes to 60 centistokes. Generally, the thickened aqueous system will contain a diluent in an amount greater than 80 percent by weight, preferably greater than 90 percent by weight. In addition to water, other diluents include compounds which lower the freezing point of the aqueous system such as ethylene glycol, propylene glycol, butylene glycol, diethylene glycol, dipropylene glycol, triethylene glycol, tetraethylene glycol, and the like, or mixtures thereof. With respect to interpreting the term "aqueous system", it will be understood to include systems with any of the mentioned diluents.

When preparing hydraulic fluids from the thickened aqueous systems, it is preferable to add other components besides the thickener and the diluent. It is particularly preferred to include a wear additive, a dispersing agent, a corrosion inhibitor, and a nitrogen-containing, phosphorus-free carboxylic solubilizer. Although these terms are defined in several U.S. patents, a brief description will be provided to eliminate any confusion.

Wear additives are described in U.S. Pat. No. 4,257,902, which is hereby incorporated by reference, as functional additives. Although all of these additives can be used to reduce the wear on hydraulic equipment resulting from operation, it is preferred to use the dialkyl or diaryl dithiophosphates and dialkyl or diaryl dithiocarbamates disclosed in U.S. Pat. No. 4,481,125, which is also hereby incorporated by reference.

The dispersing agents are also disclosed in the two patents previously mentioned. Essentially these components are water-soluble surfactants whose function is to disperse the wear additive into the thickened aqueous system. Particularly preferred, however, are those described in U.S. Pat. No. 4,491,526, which is hereby incorporated by reference, namely, certain polyether nonionic surfactants.

Corrosion inhibitors are also well known in the three patents previously mentioned. In general, compounds such as benzotriazole and its derivatives, or tolyltriazole are commonly used as corrosion inhibitors. Also used are water-soluble alkanolamines, alkali metal nitrates, nitrites, phosphates, silicates, benzoates, and heterocyclic amine compounds.

The nitrogen-containing, phosphorus-free carboxylic solubilizers are also well known in the art, namely, U.S. Pat. 4,368,133 also hereby incorporated by reference. Essentially these compounds are reaction products of alkenyl succinic anhydride with certain water-soluble active hydrogen compounds, for example a dialkyl alkanolamine.

In order to prepare the hydraulic fluid, it is not necessary to mix the components in any specific order. However, for convenience, it is useful to make a concentrate with less diluent. This is easier to ship and can be diluted at the site where the fluid will be used.

The components are used in an effective amount. This is the amount needed to achieve their specific function in the fluid.

In general the amounts of the various compounds will fall within the following ranges based upon 100 pbw of fluid:

| Component | pbw |
| --- | --- |
| Thickener | 1–10.0 |
| Wear Additive | 0.1–2.0 |
| Dispersing Agent | 1–5.0 |
| Solubilizer | 0.1–2.0 |
| Corrosion Inhibitors | 0–2.0 |

These are just typical ranges of use and the amounts for specific uses may be outside these ranges.

The examples which follow are intended to enable those skilled in the art to practice the invention, and to disclose the best mode for practicing it. However, they are not intended to cover all embodiments of the claimed invention, and those skilled in the art will recognize many equivalents of the disclosed embodiments.

The following abbreviations will be used in the examples:

LUBRIZOL 5603—reaction product of polyisobutenyl succinic anhydride and an alkanolamine sold by Lubrizol Corporation.

MIPA—monoisopropanolamine

Surfactant A—an ethylene oxide adduct of a mixture of $C_{12}$–$C_{15}$ alcohols having an average molecular weight of 500 to 600.

TT—tolyltriazole

ZDF—a zinc dialkyl dithiophosphate

In all of the examples which follow the conventional polyether polyol (herein after referred to as CPP) used was prepared by reacting a mixture of ethylene oxide and propylene oxide with trimethylolpropane such that the resulting conventional polyol had an average molecular weight of about 17,000 and an ethylene oxide/propylene oxide ratio of 85:15. The particular alpha-olefin oxides used and ratio of epoxide to hydroxyl in the thickener is specified in the table which follows. The reaction between the convention polyether and the alpha-olefin epoxides was carried out according to the procedure described in Example 1 of U.S. Pat. No. 4,411,819.

A test fluid was prepared with the thickeners so that the effectiveness of the thickeners could be measured. The fluid chosen is typical of commercially available fluids, and had the following components:

Test Fluid

| Component | Amount (parts by weight) |
| --- | --- |
| ZDP | 0.75 |
| MIPA | 1.00 |
| Morpholine | 0.95 |
| TT | 0.15 |
| LUBRIZOL 5603 | 0.35 |
| Thickener | See Table* |
| Water | Sufficient to make 100 parts of fluid. |
| | 100 parts by weight total |

*Enough thickener was added to the fluid to achieve a viscosity of about 50 Cst at 38° C.

The viscosity measurements are of kinematic viscosity at 38° C. and the units are Centistokes (Cst). The viscosities were measured by capillary viscometers. The maximum operating pressure of the fluid was measured in a Vickers 104(C) vane pump.

EXAMPLES

The examples relate to thickeners prepared with CPP which were reacted with an alpha-olefin epoxide having a total of 6 to 12 carbon atoms. The epoxide used and epoxide to hydroxyl ratio is given in Table 1 which follows.

TABLE I

| Example | Epoxide | Epoxide Hydroxyl Ratio | Concentrations of Thickener (pbw) | Viscosity (Cst) | Max. Pump Pressure (psig) |
| --- | --- | --- | --- | --- | --- |
| 1 | $C_8$ | 1.2 | 7.7 | 47.3 | 2200 |
| 2 | $C_8$ | 1.5 | 6.6 | 53.0 | 2200 |
| 3 | $C_{10}$ | 0.75 | 8.9 | 49.2 | 2200 |
| 4 | $C_{10}$ | 1.0 | 5.6 | 51.5 | 2200 |
| 5 | $C_{10}$ | 1.2 | 3.2 | 52.0 | 2100 |
| 6 | $C_{12}$ | 0.50 | 6.4 | 53.3 | 2200 |
| 7 | $C_{12}$ | 0.75 | 3.8 | 50.2 | 2200 |
| 8 | $C_{12}$ | 1.00 | 3.1 | 47.5 | 2000 |
| 9* | $C_{10}/C_{12}$ mixture | 0.88 | 5.0 | 50.0 | 2200 |

*There was a slight formulation change in this fluid.

These examples show that all of the thickeners prepared with the specified epoxide to hydroxy ratios produce a fluid having sufficient thickening efficiency at less than 10 percent weight concentration in the fluid, and that the resulting fluid will flow in a Vickers 104(C) vane pump operating at pressures of 2000 psig and greater.

COMPARISON EXAMPLE A

For comparison purposes, a thickener was prepared as in Example 8 using a $C_{12}$ alpha-olefin epoxide. However, the epoxide-to-hydroxyl ratio was 1.2 instead of 1.0. This example was chosen because it is closest to the prior art teachings in U.S. Pat. No. 4,411,819. See in particular Example 10 which uses a $C_{12}$ alpha-olefin epoxide, but has epoxide to hydroxyl ratio of 2.02. This is one of only two examples in this patent using a $C_{12}$ alpha-olefin epoxide or lower alpha-olefin epoxide.

The comparison test at a 1.2 epoxide to hydroxyl ratio showed that the test fluid had a kinematic viscosity of 51.7 Cst at 38° C. and it took a concentration of 1.78 parts by weight of thickener to achieve this viscosity. However, the maximum operating pressure for this fluid in a Vckers 104C vane pump was only 1600 psig.

Based upon applicants' data, it can be fairly stated that a fluid prepared with the thickener of Eample 10 of U.S. Pat. No. 4,411,819 would have a maximum operating pressure of even less than 1600 psig since the epoxide to hydroxyl ratio of this thickener is considerably higher than the 1.2 epoxide to hydroxyl ratio used in the comparative example.

COMPARISON EXAMPLE B

CPP, which was used to prepare the thickeners in Examples 1-9, is considered to be a non associative polyether thickener. It was found that, although this thickener can be used to thicken aqueous systems which will operate in a Vickers 104(C) Vane pump at 2000 psig, it takes 21.6 weight percent concentration to obtain a viscosity of 37.7 centistokes. There was not sufficient thickener remaining to reach a viscosity of 50 centipoises which was used as the standard in Examples 1-9.

The embodiments of the invention in which an exclusive privilege or property is claimed are defined as follows:

1. A synthetic associative polyether thickener prepared by reacting a conventional polyether polyol with an alpha-olefin epoxide having an average of from 6-12 total carbon atoms such that
   (a) the reaction is carried out in the presence of an oxyalkylation catalyst at a temperature of from about 50° C. to about 150° C.; and
   (b) an epoxide-to-hydroxyl ratio defined as follows:
      (i) if a $C_{12}$ alpha-olefin epoxide is reacted with the conventional polyether polyol, then the epoxide-to-hydroxyl ratio is from about 0.50 to about 1.0;
      (ii) if a $C_{10}$ alpha-olefin epoxide is reacted with the conventional polyether polyol, then the epoxide-to-hydroxyl ratio is from about 0.75 to about 1.25;
      (iii) if a $C_8$ alpha-olefin epoxide is reacted with the conventional polyether polyol, then the epoxide-to-hydroxyl ratio is from about 1.0 to about 2.0; and
      (iv) if a $C_6$ alpha-olefin epoxide is reacted with the conventional polyether polyol, then the epoxide-to-hydroxyl ratio is from about 1.5 to about 3.5.

2. The thickener of claim 1 wherein the average molecular weight of the thickener is from 5,000 to 50,000.

3. The thickener of claim 2 wherein the conventional polyether used is a homopolymer based upon ethylene oxide.

4. The thickener of claim 2 wherein the conventional polyether polyols used is a block polymer having an internal ethylene oxide block, and an external propylene oxide block.

5. The thickener of claim 2 wherein the conventional polyether polyol used is a heteric copolymer formed by reacting ethylene oxide and propylene oxide with an initiator.

6. The thickener of claim 5 wherein the weight ratio f ethylene oxide to propylene oxide is from 90:10 to 10:90.

7. A thickened aqueous system which comprises an effective thickening amount of the thickener of claim 1 and a diluent.

8. A thickened aqueous system which comprises an effective thickening amount of the thickener of claim 2 and a diluent.

9. A thickened aqueous system which comprises an effective thickening amount of the thickener of claim 3 and a diluent.

10. A thickened aqueous system which comprises an effective thickening amount of the thickener of claim 4 and a diluent.

11. A thickened aqueous system which comprises an effective thickening amount of the thickener of claim 5 and a diluent.

12. A thickened aqueous system which comprises an effective thickening amount of the thickener of claim 6 and a diluent.

13. A hydraulic fluid comprising the thickened aqueous system of claim 7 and
   (a) an effective wear reducing amount of a wear additive; and
   (b) an effective dispersing amount of a dispersing agent.

14. A hydraulic fluid comprising the thickened aqueous system of claim 8 and
   (a) an effective wear reducing amount of a wear additive; and
   (b) an effective dispersing amount of a dispersing agent.

15. A hydraulic fluid comprising the thickened aqueous system of claim 9 and
   (a) an effective wear reducing amount of a wear additive; and
   (b) an effective dispersing amount of a dispersing agent.

16. A hydraulic fluid comprising the thickened aqueous system of claim 10 and
   (a) an effective wear reducing amount of a wear additive; and
   (b) an effective dispersing amount of a dispersing agent.

17. The hydraulic fluid of claim 11 which also contains an effective solubilizing amount of a nitrogen-containing phosphorus-free carboxylic solubilizer.

18. The hydraulic fluid of claim 12 which also contains an effective solubilizing amount of a nitrogen-containing phosphorus-free carboxylic solubilizer.

19. The hydraulic fluid of claim 13 which also contains an effective solubilizing amount of a nitrogen-containing phosphorus-free carboxylic solubilizer.

20. The hydraulic fluid of claim 14 which also contains an effective solubilizing amount of a nitrogen-containing phosphorus-free carboxylic solubilizer.

21. The hydraulic fluid of claim 15 which also contains an effective corrosion inhibiting amount of a corrosion inhibitor.

22. The hydraulic fluid of claim 16 which also contains an effective corrosion inhibiting amount of a corrosion inhibitor.

23. The hydraulic fluid of claim 17 which also contains an effective corrosion inhibiting amount of a corrosion inhibitor.

24. The hydraulic fluid of claim 18 which also contains an effective corrosion inhibiting amount of a corrosion inhibitor.

25. The hydraulic fluid of claim 19 which also contains an effective corrosion inhibiting amount of a corrosion inhibitor.

* * * * *